(12) United States Patent
Lu et al.

(10) Patent No.: US 10,648,645 B2
(45) Date of Patent: May 12, 2020

(54) REFLECTIVE ASSEMBLY, BACKLIGHT MODULE AND DISPLAY DEVICE

(71) Applicant: BOE Technology Group Co., Ltd., Beijing (CN)

(72) Inventors: Yongchun Lu, Beijing (CN); Yong Qiao, Beijing (CN); Hongfei Cheng, Beijing (CN); Jianbo Xian, Beijing (CN); Yongda Ma, Beijing (CN); Jian Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/787,710

(22) PCT Filed: Apr. 21, 2015

(86) PCT No.: PCT/CN2015/077090
§ 371 (c)(1),
(2) Date: Oct. 28, 2015

(87) PCT Pub. No.: WO2016/050057
PCT Pub. Date: Apr. 7, 2016

(65) Prior Publication Data
US 2017/0292677 A1  Oct. 12, 2017

(30) Foreign Application Priority Data

Sep. 30, 2014  (CN) .................... 2014 2 0574770 U

(51) Int. Cl.
*F21V 7/04* (2006.01)
*G02F 1/1335* (2006.01)
(Continued)

(52) U.S. Cl.
CPC ............... *F21V 7/048* (2013.01); *F21V 7/05* (2013.01); *G02F 1/133605* (2013.01); *G02F 1/133604* (2013.01)

(58) Field of Classification Search
CPC .. G02F 1/33606; G02F 1/133605; F21K 9/62; F21V 7/09; G02B 6/055
See application file for complete search history.

(56) References Cited

U.S. PATENT DOCUMENTS

2007/0121320 A1* 5/2007 Arai .................. G02F 1/133603
362/247
2007/0230206 A1* 10/2007 Hsiao ................ G02F 1/133605
362/560

(Continued)

FOREIGN PATENT DOCUMENTS

CN  1831611 A  9/2006
CN  1860328 A  11/2006

(Continued)

OTHER PUBLICATIONS

Jul. 6, 2015—International Search Report and Written Opinion Appn PCT/CN2015/077090 with English Tran.

*Primary Examiner* — Anh T Mai
*Assistant Examiner* — Zachary J Snyder
(74) *Attorney, Agent, or Firm* — Banner & Witcoff, Ltd.

(57) ABSTRACT

The present invention relates to technical filed of display and discloses a reflective assembly, a backlight module and a display device which can effectively enhance the reflective effect at the edge area of the reflective assembly to improve the display brightness thereof to be in close proximity to the central area so as to achieve a uniform display. The reflective assembly comprises a first reflective plate and a second reflective plate configured along an edge of the first reflective plate, wherein the second reflective plate is inclined towards a direction facing away the first reflective plate with (Continued)

respective to a plane perpendicular to the edge of the first reflective plate, and wherein a reflective surface of the first reflective plate and a reflective surface of the second reflective plate are located at a same side.

8 Claims, 2 Drawing Sheets

(51) Int. Cl.
    *F21V 7/05*     (2006.01)
    *G02F 1/13357*     (2006.01)

(56) References Cited

U.S. PATENT DOCUMENTS

| | | | |
|---|---|---|---|
| 2008/0211989 A1* | 9/2008 | Park | G02F 1/133603 349/64 |
| 2012/0069248 A1* | 3/2012 | Yokota | G02F 1/133605 348/739 |
| 2012/0206904 A1 | 8/2012 | Nakanishi | |
| 2012/0250293 A1* | 10/2012 | Jeong | G02F 1/133605 362/97.2 |
| 2013/0188100 A1* | 7/2013 | Ikuta | G02F 1/00 348/739 |
| 2015/0146436 A1* | 5/2015 | Heo | F21V 7/09 362/346 |

FOREIGN PATENT DOCUMENTS

| | | |
|---|---|---|
| CN | 201063086 Y | 5/2008 |
| CN | 101639182 A | 2/2010 |
| CN | 204127788 U | 1/2015 |
| WO | 2012060313 A1 | 5/2012 |

\* cited by examiner

REFLECTIVE ASSEMBLY, BACKLIGHT MODULE AND DISPLAY DEVICE

The application is a U.S. National Phase Entry of International Application No. PCT/CN2015/077090 filed on Apr. 21, 2015, designating the United States of America and claiming priority to Chinese Patent Application No. 201420574770.2 filed on Sep. 30, 2014. The present application claims priority to and the benefit of the above-identified applications and the above-identified applications are incorporated by reference herein in their entirety.

TECHNICAL FILED

Embodiments of the present invention relate to a reflective assembly, a backlight module and a display device.

BACKGROUND

With consistent and rapid development of liquid crystal (LC) display industry, various new types of LC products are emerging out of the old ones. LC display panel is a kind of non-self-luminous display panel and hence requires a light source provided by a backlight module to achieve its function of display. The backlight module can be classified into an edge-lit type and a direct-lit type, depending on a location of the light source arranged therein. The light source of the direct-lit type backlight module is disposed right below the LC display panel to allow a relatively higher light source density of the LC display panel, thus LC display products incorporated with such kind of backlight module are mostly applied in displays with strict requirements on brightness, such as display screen of computer and LC TV.

As illustrated in FIG. 1, for a direct-lit type backlight module well-known in the art, a reflective plate 20 having a two-dimensional structure is placed horizontally at a planar state on a back plate 10, which allows light emitted from a light source 30 being reflected uniformly. However, the light at an area adjacent to an edge of the reflective plate 20 is relatively weaker, which makes it possible that the display panel 50 has image brightness smaller at the edge area than a central area, which will lead to non-uniform brightness and also influence the display effect.

SUMMARY

In one aspect, at least one embodiment of the present invention provides a reflective assembly comprising a first reflective plate and a second reflective plate disposed along an edge of the first reflective plate, wherein the second reflective plate is inclined towards a direction facing away the first reflective plate with respective to a plane perpendicular to the edge of the first reflective plate, and wherein a reflective surface of the first reflective plate and a reflective surface of the second reflective plate are located at a same side.

In one example, the first reflective plate and the second reflective plate are connected integrally.

In one example, both the first reflective plate and the second reflective plate are formed as a planar structure, and the reflective surface of the first reflective plate and the reflective surface of the second reflective plate have an included angle between 120° and 150°.

In one example, the first reflective plate is formed as a planar structure, while the second reflective plate is formed as a cambered structure; and the first reflective plate and a tangent line of any point on the second reflective plate have an included angle equal to or larger than 90°.

In one example, the first reflective plate is a rectangular reflective plate; and the second reflective plate comprises four reflective sub-plates which are connected to four sides of the first reflective plate, respectively.

In one example, portions of adjacent reflective sub-plates that are close to each other have an overlapped area.

In one example, at least one of the reflective surface of the first reflective plate and the reflective surface of the second reflective plate is provided with an optical dot.

On another aspect, at least one embodiment of the present invention further provides a backlight module comprising a light source and a reflective assembly; wherein the light source is disposed at a side of the reflective assembly where the reflective surface of the first reflective plate is located.

In one example, the backlight module further comprises a back plate and an optical film; wherein the reflective assembly is disposed between the back plate and the optical film.

In one example, the backlight module further comprises a supporting structure configured to support the light source, wherein the supporting structure is arranged to penetrate through the reflective assembly to be fixed at the back plate.

In one example, the light source comprises a plurality of light emitting diodes arranged in an array; wherein the plurality of light emitting diodes is disposed between the reflective assembly and the optical film.

In one example, the plurality of light emitting diodes is disposed at a location in correspondence with a location of the first reflective plate of the reflective assembly.

On yet another aspect, at least one embodiment of the present invention further provides a display device comprising a display panel and a backlight module; wherein the backlight module is implemented with any of the above-illustrated backlight modules.

The reflective assembly as provided by embodiments of the present invention comprises a first reflective plate disposed at a central area and a second reflective plate disposed at an edge area so that the reflective effect at the edge area can be improved by inclining the second reflective plate towards a direction facing away the first reflective plate with respective to a plane perpendicular to the edge of the first reflective plate; In this way, when the reflective assembly is applied in a backlight module to provide a display panel with a backlight source, the arrangement of the second reflective plate can effectively enhance the reflective effect at the edge area so as to improve display brightness thereof to be uniform with the central area, which overcomes the defect that the display brightness of well-known display panels always is relatively weaker at the edge area and relatively stronger at the central area, thereby achieving a uniform display.

BRIEF DESCRIPTION OF THE DRAWINGS

Embodiments of the present invention will be described in more detail below with reference to the accompanying drawings to enable those skilled in the art to understand the present invention more clearly, wherein.

Figure 1:
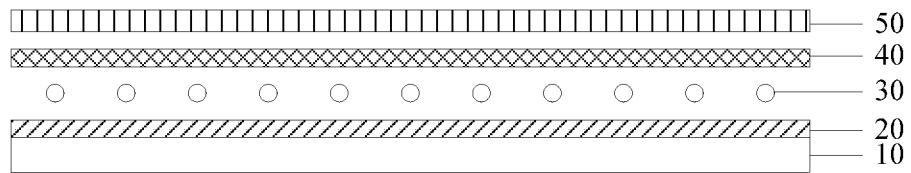
FIG. 1 is a schematic diagram illustrating a structure of a well-known direct-lit backlight module.

REFERENCE NUMERALS 10-back plate; 20-reflective plate; 200-reflective assembly; 201-first reflective plate; 202-second reflective plate; 30-light source; 40-optical film; 50-display panel.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Figure 2:
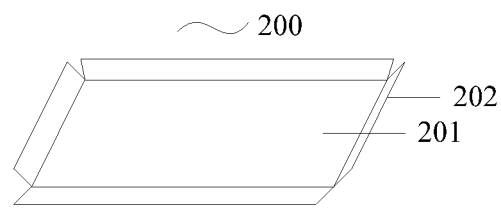
FIG. 2 is a schematic diagram illustrating a structure of a reflective assembly as provided by an embodiment of the present invention.
Figure 3:
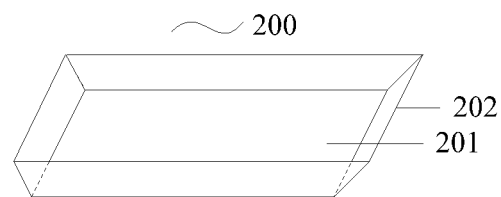
FIG. 3 is another schematic diagram illustrating a structure of a reflective assembly as provided by an embodiment of the present invention.
Figure 4:
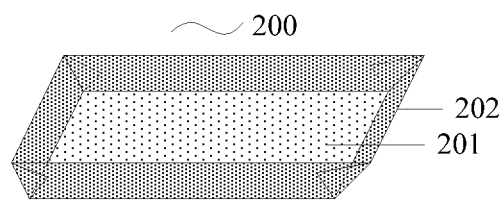
FIG. 4 is yet another schematic diagram illustrating a structure of a reflective assembly as provided by an embodiment of the present invention.

As illustrated in FIGS. 2-4, embodiments of the present invention provide a reflective assembly 200 comprising a first reflective plate 201 and a second reflective plate 202 disposed along an edge of the first reflective plate 201, wherein the second reflective plate 202 is inclined towards a direction facing away the first reflective plate 201 with respective to a plane perpendicular to the edge of the first reflective plate 201, and wherein a reflective surface of the first reflective plate 201 and a reflective surface of the second reflective plate 202 are located at a same side of the reflective assembly 200.

Figure 7A:
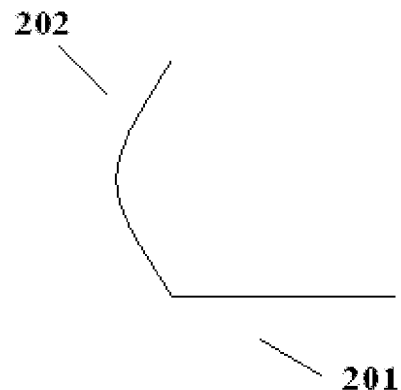
FIGS. 7A-7B are schematic diagrams illustrating a convex structure or a concave structure of a reflective plate in the reflective assembly as provided by an embodiment of the present invention.
Figure 7B:
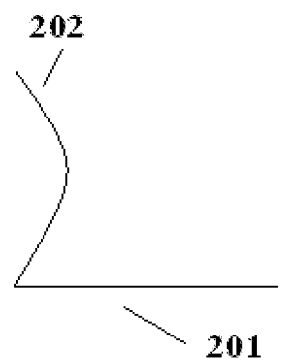

It should be explained that, first of all, the reflective assembly 200 as provided by embodiments of the present invention is generally applied in a backlight module. In practical implementation, the reflective assembly 200 has to be fixed by placing the first reflective plate 201 horizontally at a planar state on a back plate, so the first reflective plate 201 in one example is formed as a planar structure; based on which the second reflective plate 202 can be formed as a planar structure or a cambered structure, without details defined particularly herein; wherein the cambered structure can comprise a convex structure as illustrated in FIG. 7A or a concave structure as illustrated in FIG. 7B.

Secondly, the first reflective plate 201 can have a shape of rectangular or oval or alternatively other shapes of course, without details defined particularly herein; based on which the edge of the first reflective plate 21 can have a shape designed varyingly depending on the shape of the first reflective plate 21 per se, but the plane perpendicular to the edge of the first reflective plate 201 will be always perpendicular to a plane where the first reflective plate 201 lies. In this way, the second reflective plate 202 is inclined towards a direction facing away the first reflective plate 201 with respective to the above-mentioned plane perpendicular to the edge of the first reflective plate 201, at an inclined angle which is not particularly defined herein, as long as it allows achieving the desired reflective effect. For example, given the plane perpendicular to the edge of the first reflective plate 201 as the reference plane, inclining towards the direction facing away the first reflective plate 201 is interpreted as "inclining outwardly" in FIGS. 2-4, while inclining towards the direction approaching the first reflective plate 201 is interpreted as "inclining inwardly" in FIGS. 2-4.

Thirdly, in some examples the first reflective plate 201 and the second reflective plate 202 of the reflective assembly 200 can be connected integrally, while in some other examples the first reflective plate 201 and the second reflective plate 202 are connected independently (i.e., connected as two separate members), without details particularly defined herein. Based on which the first reflective surface of the first reflective plate 201 and the reflective surface of the second reflective plate 202 can be made of a same material or made of different materials, without details particularly defined herein.

In one example, the reflective surface of the first reflective plate 201 and the reflective surface of the second reflective plate 202 can be made of a material having high reflectivity; for example, the material can be metal or alloy material such as silver, aluminum, gold, chromium, copper, indium, iridium, nickel, platinum and tin, or can be white paint vehicle resistant to xanthation and heat, without limiting the present invention thereto; instead, it can be any material well-known in the art to have excellent reflective effect as well as stable physical and chemical properties.

As above, the reflective assembly 200 as provided by embodiments of the present invention comprises a first reflective plate 201 and a second reflective plate 202 disposed along an edge of the first reflective plate 201, wherein the second reflective plate 202 is inclined towards a direction facing away the first reflective plate 201 with respective to a plane perpendicular to the edge of the first reflective plate 201, and wherein a reflective surface of the first reflective plate 201 and a reflective surface of the second reflective plate 202 are located at a same side of the reflective assembly 200.

In practical implementation where a backlight module serves to provide a display panel with a backlight source, the display panel always has brightness weaker at an edge area than a central area thereof. However, according to embodiments of the present invention, the reflective assembly 200 comprises a first reflective plate 201 disposed at the central area and a second reflective plate 202 disposed at the edge area (that is, disposed at the edge of the first reflective plate), so that the reflective effect at the edge area of the reflective assembly 200 can be effectively improved by configuring the second reflective plate 202 to be inclined towards a direction facing away the first reflective plate 201 with respective to a plane perpendicular to the edge of the first reflective plate 201; in this way, when the reflective assembly 200 is applied in a backlight module to provide a display panel with a backlight source, the arrangement of the second reflective plate 202 can effectively improve the reflective effect at the edge area, and hence can improve the display brightness at the edge area of the display panel to be uniform with the central area, so as to achieve an uniform display.

In one example, the first reflective plate 201 and the second reflective plate 202 can be connected integrally. Herein, with an integral structure of the first reflective plate 201 and the second reflective plate 202, the reflective assembly 200 can be manufactured by an integral forming process. In this way, as compared with those reflective assemblies with non-integral structures, it's unlikely for the first reflective plate 201 and the second reflective plate 202 to have a gap there-between, and the problem of uneven reflection due to a non-reflective area existed at the portion where the first reflective plate 201 and the second reflective plate 202 are jointed can be effectively prevented.

In some examples, both the first reflective plate 201 and the second reflective plate 202 can be formed as a planar structure, and the first reflective plate 201 and the second reflective plate 202 can have an included angle between 120° and 150°.

Of course, in another example, the second reflective plate 202 can be formed as a cambered structure; in such case, it's only necessary to ensure that the first reflective plate 201 and a tangent line of any point on the second reflective plate 202 have an included angle equal to or larger than 90°, that is, the include angle is a right angle or an obtuse angle.

Based on the above examples, a manufacture process of the reflective assembly 200 can be effectively simplified by forming both the first reflective plate 201 and the second reflective plate 202 as a planar structure. In this way, it can not only effectively improve reflective effect of light at the edge area of the reflective assembly 200 but also avoids the light being reflected by focusing on the central area, so as to achieve an uniform display which allows the display brightness at the edge area being uniform with the central area.

In some examples, as illustrated in FIG. 4, the reflective surface of the reflective plate 201 and/or the reflective surface of the second reflective plate 202 can be provided with an optical dot to enhance the reflective effect of the reflective assembly 200. For example, the optical dot can be printed onto the reflective surface by printing methods after manufacture of the reflective plate, or can be directly formed on the reflective surface by chemical etching method, precision machining method (V-cut), photolithography process or internal diffusing method during manufacture of the reflective plate. The optical dot can be formed into any shape including, for example, round, rhombus, triangle, oval and cone, and can be formed to be raised from or concaved into the reflective surface. For example, the optical dot on the reflective surface of the first reflective plate 201 can be distributed at a density identical with or different from that on the reflective surface of the second reflective plate 202.

Herein it should be explained that, a planar structure of the first reflective plate 201 and/or the second reflective plate 202 are/is defined from the macroscopical aspect; in the case where the reflective surface(s) of the first reflective plate 201 and/or the second reflective plate 202 are/is further provided with an optical dot, the optical dot has a dimension small enough so as not to influence the surface structure of the first reflective plate 201 and/or the second reflective plate 202, thus the first reflective plate 201 and/or the second reflective plate 202 provided with the optical dot can still be regarded as having a planar structure.

In some example, as illustrated in FIGS. 2-4, the first reflective plate 201 can be a rectangular reflective plate; and the second reflective plate 202 can comprise four reflective sub-plates connected to four sides of the first reflective plate 201, respectively.

Herein it should be explained that the shape of the first reflective plate 201 is not limited to rectangular but can have other options such as oval; however, regardless of the shape of the reflective plate 201, the second reflective plate 202 always has to be connected to the first reflective plate 201 so as to prevent any gap existed at a jointed portion between the first reflective plate 201 and the second reflective plate 202, which gap may lead to non-uniform light reflection.

On such basis, the four reflective sub-plates of the second reflective plate 202 can be or can be not contacted with each other; of course, they can also be partly contacted with each other. Embodiments of the present invention are not intended to define particularly the contact between adjacent reflective sub-plates.

Referring to FIG. 4, in the case where the four reflective sub-plates are contacted with each other, portions of respective reflective sub-plates that are close to each other can have an overlapped area there-between. For light incident on the edge area of the reflective assembly 200, it will return to a light emitting side through a reflection by the second reflective plate 202; in this way, it can ensure that the light incident on the second reflective plate 202 is completely reflected so as to avoid any gap area generated between adjacent reflective sub-plates, which gap area may lead to a display failure resulted from non-uniform light reflection.

Figure 5:
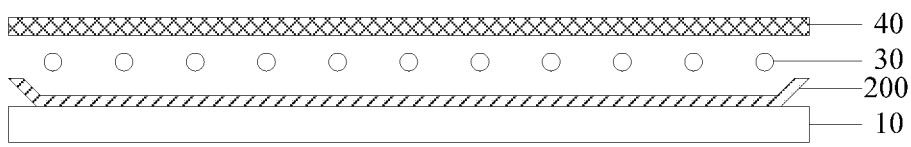
FIG. 5 is a schematic diagram illustrating a structure of a backlight module as provided by an embodiment of the present invention.

As illustrated in FIG. 5, embodiments of the present invention further provide a backlight module comprising a light source 30 and a reflective assembly 200; wherein the reflective assembly 200 can be implemented with the one described in any of the above examples.

On such basis, the light source 30 has to be disposed at a side of the reflective assembly 200 where the first reflective plate 201 is located; in other words, the second reflective plate 202 of the reflective assembly 200 is bent towards the side where the light source 30 is located, so as to ensure that the light emitted from the light source 30 will return to the light emitting side through a reflection by a reflective surface of the reflective assembly 200, upon reaching the reflective surface.

Herein it should be explained that the light source 30 can be disposed at the side where the reflective surface of the reflective assembly 200 is located in such a manner that, for example, the light emitting side of the light source 30 is located at the side of the reflective assembly 200 where the reflective surface is located, while a supporting structure configured to support the light source 30 has to be fixed onto a back plate by penetrating through the reflective assembly 200.

On such basis, referring to FIG. 5, in some examples the backlight module can further comprise a back plate 10 and an optical film 40; wherein the reflective assembly 200 is disposed between the back plate 10 and the optical film 40. In this way, the reflective effect of light at the edge area of the reflective assembly 200 can be effectively improved by bending the second reflective plate 202 of the reflective assembly 200 towards the optical film 40, so as to avoid a brightness weaker at the edge area than the central area; in this way, light being reflected can be uniformly emitted upon passing through the optical film 40.

For example, the optical film 40 can comprise a diffusion film, a prism sheet, a brightness enhancement film, etc., which can be combined in any ways according to actual demands.

According to embodiments of the present invention, the back plate 10 is configured to support respective components of the backlight module including the above-mentioned reflective assembly 200, the light source 30 and the optical film 40. For example, the optical film 40 can be fixed by an adhesive frame (not illustrated), while the adhesive frame in turn can be fixed at the back plate 10 by engaging devices.

On such basis, in one example, the reflective assembly 200 comprises a first reflective plate 201 and a second reflective plate 202; and wherein the first reflective plate 201 can be fixed at the back plate 10 by a positioning pole (not illustrated) so as to prevent the reflective assembly 200 from moving with respective to the back plate 10.

In one example, the light source 30 can comprise a plurality of light emitting diodes (LEDs) arranged in an array; the plurality of LEDs can be disposed between the reflective assembly 200 and the optical film 40. For example, the plurality of LEDs can be disposed at a location in correspondence with a location of the first reflective plate 201 of the reflective assembly 200, so a brightness at an area (i.e., the edge area) to which the second reflective plate 202 corresponds will be considerably weaker than an area (i.e., the central area) to which the first reflective plate 201 corresponds; on such basis, the brightness at the edge area can be improved to be in close proximity to the brightness of the central area by increasing the light reflection at the edge area so as to achieve an uniform display. In this way, the reflective assembly 200 as provided by embodiments of the present invention can effectively increase the light reflection at the edge area to improve the display brightness thereof to be uniform with the central area, so as to achieve a uniform display.

Of course, cold cathode fluorescent lamp (CCFL) can also be used as the light source 30 in embodiments of the present invention, without any limitation thereto.

Figure 6:
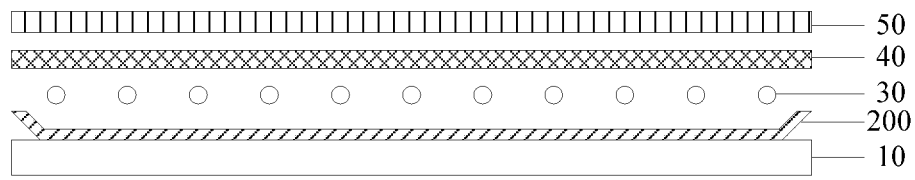
FIG. 6 is a schematic diagram illustrating a structure of a display device as provided by an embodiment of the present invention.

Embodiments of the present invention further provide a display device, as illustrated in FIG. 6, it comprises a display panel 50 and a backlight module; wherein the backlight module is the one described in any of the above examples.

Herein it should be explained that the display device can be of non-self-illumination type such as LC display device or LC television, and can be supplied with a backlight source by the backlight module in embodiments of the present invention which can effectively improve the display brightness at the edge area of the display panel 50 to be uniform with the central area, so as to achieve a uniform display.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

The present application claims the priority of China patent application No. 201420574770.2 filed on Sep. 30, 2014 titled "REFLECTIVE ASSEMBLY, BACKLIGHT MODULE AND DISPLAY DEVICE", which is incorporated herein by reference in its entirely.

What is claimed is:

1. A direct-lit type backlight module, comprising a reflective assembly and a light source,
   the reflective assembly comprising:
      a first reflective plate; and
      a second reflective plate that is disposed along an edge of the first reflective plate at a side of a reflective surface of the first reflective plate and is inclined towards a direction facing away from the first reflective plate, wherein
      the reflective surface of the first reflective plate and a reflective surface of the second reflective plate are located at a same side of the reflective assembly,
      the second reflective plate comprises several reflective sub-plates which are connected to sides of the first reflective plate, respectively, and portions of adjacent reflective sub-plates that are close to each other have an overlapped area,
      the first reflective plate is formed as a planar structure while the second reflective plate is formed as a concave structure having a center of circle, wherein the center of circle of the concave structure and the reflective surface of the second reflective plate are located at different sides of the second reflective plate, respectively,
      the reflective surface of the first reflective plate and the reflective surface of the second reflective plate are provided with an optical dot,
      the optical dot is formed into a shape of round, rhombus, triangle, oval or cone, and is formed to be raised from or concaved into the reflective surface of the first reflective plate and the reflective surface of the second reflective plate,
      the optical dot is directly formed on the reflective surface of the first reflective plate and the reflective surface of the second reflective plate by one of chemical etching method, photolithography process and internal diffusing method, during manufacture of the first reflective plate and the second reflective plate,
      the optical dot on the reflective surface of the first reflective plate is distributed at a density different from that on the reflective surface of the second reflective plate, and
      the light source is disposed at a side of the reflective assembly where the reflective surface of the first reflective plate is located.

2. The direct-lit type backlight module of claim 1, wherein the first reflective plate and the second reflective plate are connected integrally.

3. The direct-lit type backlight module of claim 1, wherein the first reflective plate and a tangent line of any point on the second reflective plate have an included angle equal to or larger than 90°.

4. The direct-lit type backlight module of claim 1, wherein the first reflective plate is a rectangular reflective plate; and the second reflective plate comprises four reflective sub-plates which are connected to four sides of the first reflective plate, respectively.

5. The direct-lit type backlight module of claim 1, further comprising a back plate and an optical film; wherein the reflective assembly is disposed between the back plate and the optical film.

6. The direct-lit type backlight module of claim 5, wherein the light source comprises a plurality of light emitting diodes arranged in an array; and
    wherein the plurality of light emitting diodes is disposed between the reflective assembly and the optical film.

7. The direct-lit type backlight module of claim 6, wherein the plurality of light emitting diodes is disposed at a location in correspondence with a location of the first reflective plate of the reflective assembly.

8. A display device comprising a display panel and a backlight module; wherein the backlight module is the direct-lit type backlight module of claim 1.

\* \* \* \* \*

UNITED STATES PATENT AND TRADEMARK OFFICE
CERTIFICATE OF CORRECTION

PATENT NO. : 10,648,645 B2  
APPLICATION NO. : 14/787710  
DATED : May 12, 2020  
INVENTOR(S) : Lu et al.

Page 1 of 1

It is certified that error appears in the above-identified patent and that said Letters Patent is hereby corrected as shown below:

On the Title Page

Item (30) Foreign Application Priority Data, Column 1, Line 2:  
Delete "2014 2 0574770 U" and insert --201420574770.2--

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*